US004001699B2

United States Statutory Invention Registration [19]

[11] Reg. Number: H1699

[45] Published: Dec. 2, 1997

Vavrick

[54] THERMAL BOND SYSTEM

[75] Inventor: Daniel J. Vavrick, Beltsville, Md.

[73] Assignee: The United States of America as represented by the Secretary of the Navy, Washington, D.C.

[21] Appl. No.: 551,214

[22] Filed: Oct. 31, 1995

[51] Int. Cl.[6] ..... B32B 31/00

[52] U.S. Cl. ..... 156/276

[58] Field of Search ..... 156/276; 437/902; 257/178, 706

[56] References Cited

U.S. PATENT DOCUMENTS

| | | | |
|---|---|---|---|
| 3,694,699 | 9/1972 | Snyder et al. | 317/100 |
| 4,842,911 | 6/1989 | Fick | 428/40 |
| 4,888,247 | 12/1989 | Zweben et al. | 428/105 |
| 5,088,007 | 2/1992 | Missele . | |
| 5,200,365 | 4/1993 | Culver | 437/209 |
| 5,224,017 | 6/1993 | Martin | 361/388 |
| 5,224,030 | 6/1993 | Banks et al. | 361/386 |
| 5,285,108 | 2/1994 | Hastings et al. | 257/712 |

FOREIGN PATENT DOCUMENTS

| | | | |
|---|---|---|---|
| 61-4255 | 1/1986 | Japan | H01L 23/36 |
| 382145 | 4/1991 | Japan | H01L 23/36 |
| 2196472 | 4/1988 | United Kingdom | H01L 21/58 |

*Primary Examiner*—Charles J. Jordan
*Assistant Examiner*—Meena Chelliah
*Attorney, Agent, or Firm*—James B. Bechtel, Esq.

[57] ABSTRACT

A thermal bond system is provided for bonding a first component that produces heat to a second component that dissipates heat. Carbon or other thermally conductive fiber tows are woven together to define a fabric mesh having first and second opposing woven surfaces. An adhesive bond that is flowable prior to drying is used to wet and cover the first and second opposing surfaces. The adhesive bond extends into interstices formed between adjacent fiber tows.

16 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL BOND SYSTEM

ORIGIN OF THE INVENTION

The invention described herein was made by an employee during duty with the Department of the Navy and may be manufactured, used, licensed by or for the Government for any governmental purpose without payment of any royalties thereon.

FIELD OF THE INVENTION

The invention relates generally to bonding systems, and more particularly to a thermal bond system for bonding a heat-producing component to a heat-dissipating component in order to efficiently transfer heat between components and to allow for the possible breaking of the bond without the use of extreme temperature and/or force.

BACKGROUND OF THE INVENTION

Thermally conductive bonds are typically used when a heat-producing electronic component is to be bonded to a heat-dissipating component, i.e., a heat sink or thermal doubler. For best conductivity, the bond is a solid or continuous thermal conductor such as solder. Unfortunately, solder banding metals must be re-heated to a relatively high temperature in order to remove the attached component. The high heat required can damage or destroy the electronic component being removed. Thus, solder may not be a suitable thermal bond when it may be necessary to detach the bonded electronic components.

There are alternatives to the solder bond which have a relatively high thermal conductivity and which bond both metals and non-metals. These include thermoplastic resin or epoxy bond materials that have had thermally conductive particles or whiskers mixed therein. Because these bond materials are low in thermal conductivity, the thermally conductive particles or whiskers need to be mixed in a sufficient percentage to enhance the thermal properties thereof. Such thermally enhanced bonds are well known in the art. However, thermoplastic resin material can require high application and/or removal temperatures. Epoxy bond materials often become relatively strong upon curing thereby making the removal of an attached component difficult or impossible without the addition of relatively high heat or large forces.

SUMMARY OF THE INVENTION

Accordingly, it is an object of the present invention to provide a thermal bond system for forming an efficient heat-transferring bond between a first heat-producing component and a second heat dissipating component.

Another object of the present invention is to provide a thermal bond for bonding two components such that the bond can be broken without damaging either of the two components.

Still another object of the present invention is to provide a thermal bond system that is thin.

Other objects and advantages of the present invention will become more obvious hereinafter in the specification and drawings.

In accordance with the present invention, a thermal bond system is provided for bonding a first component that produces heat to a second component that dissipates heat. Carbon or other thermally conductive fibers or fiber tows are woven together to define a fabric mesh having first and second opposing woven surfaces. As a result, interstices are formed between adjacent fibers or fiber tows. An adhesive bond that has low enough viscosity to flow between the fibers or fiber tows is used to wet and cover the first and second opposing surfaces. The adhesive bond extends into the interstices. The flow of heat from the first to the second component follows a path primarily defined by the woven fibers or fiber tows. Since the adhesive bond only exists as a thin-layer (e.g., on the order of a few tenths of a mil) where the carbon or other thermally conductive fibers or fiber tows are closest to the first and second components, the non-conductive nature of the adhesive bond has a minimal effect on the system's overall thermal conductive properties. The interstices between the fibers or fiber tows form pockets that contain the adhesive bond. This increases the contact surface area so that the adhesive bond can form a good bond between the first and second component and the fibers or fiber tows.

DETAILED DESCRIPTION OF THE INVENTION

Figure 1:
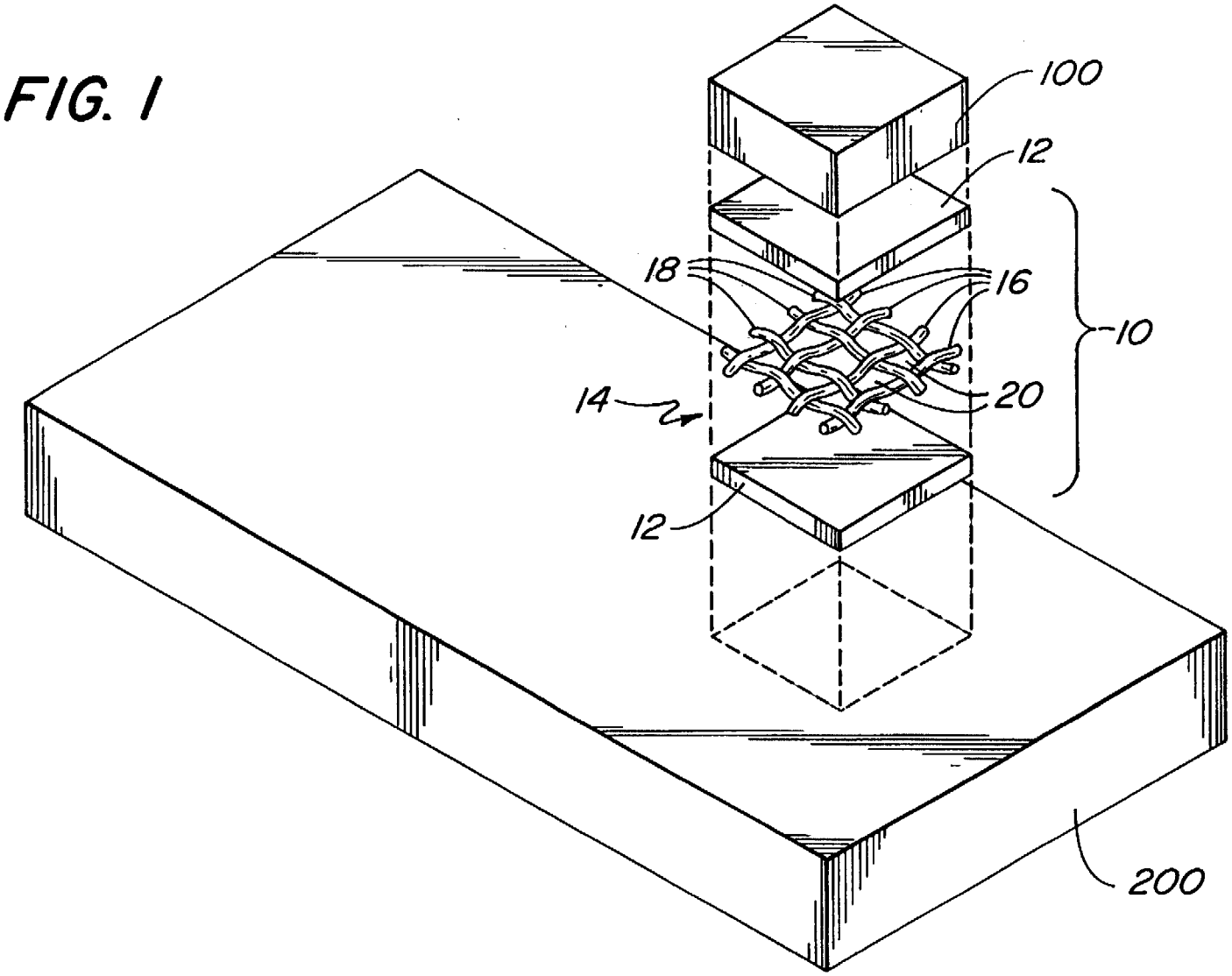
FIG. 1 is an exploded perspective view of the thermal bond system of the present invention interposed between two components.

Referring now to the drawings, and more particularly to FIG. 1, the thermal bond system of the present invention is shown in an exploded view between two components to be bonded together thereby. More specifically, thermal bond system 10 will be described for its use in bonding heat-producing component 100 to heat-dissipating component 200 such as a thermal doubler or heat sink as it will be referred to hereinafter. Heat-producing component 100 is typically an electronic component that generates heat during operation thereof that is preferably dissipated by heat sink 200. Such heat-producing components and heat sinks can come in a variety of shapes and sizes as well known in the art. Thus, the specifics of these elements will not be discussed further herein.

Thermal bond system 10 consists of adhesive 12 and a layer of thermally conductive fabric 14. Thermally conductive fabric 14 is a fabric mesh of warp fiber tows 16 and fill fiber tows 18 with interstices 20 formed therebetween. Depending on the fiber volume or tightness of the weave of thermally conductive fabric 14, interstices 20 can extend only partially into fabric 14 in the case of a tight weave or all the way through fabric 14 in the case of a looser weave. For the best thermal conductivity, thermally conductive fabric 14 is woven tightly. The types of weave used can include, but are not limited to, a plain weave (FIG. 1), a basket weave, a twill weave, a crowfoot weave, a satin weave (FIG. 2), and a leno weave. Descriptions of the various weave types can be found in "Composite Basics", by Andrew C. Marshall, Marshall Consulting, Walnut Creek, Calif., 1993, the relevant portions of which are found in Chapter 2. In terms of thermal conductivity, it is important for the thermally conducting fiber tows of fabric 14 to cross in some fashion in order to provide for heat transfer in all directions as will be explained further below. The area occupied by thermally conductive fabric 14 should generally be commensurate with the area of component 100 reserved for bonding.

At least a portion, and typically a majority or all, of the fiber tows used for warp fiber tows 16 and fill fiber tows 18 must be made from a thermally conductive material. The choice of material for the thermally conductive ones of tows 16 and 18 includes such thermally conductive material as carbon, copper, gold, silver and aluminum. For the best performance in terms of thermal conductivity, fiber tows 16 and 18 are all made from high conductivity carbon fibers such as the K-1100 carbon fiber manufactured by Amoco Performance Products, Inc., Alpharetta, Ga. Since it is desirable to minimize the overall thickness of thermal bonding system 10, high conductivity carbon fibers represent a good choice owing to their commercial availability in 2 K tows of individual fibers with diameters of 10 microns. The flexibility of the carbon fibers is critical to allow for a variety of weave configurations. It has been found that carbon fiber tows that have not been heat treated prior to being woven offer a greater amount of flexibility during weaving.

Adhesive 12 is any suitable bonding adhesive satisfying the requirements of the bonding application. For example, when the bonding application requires that component 100 be easily removed from heat sink 200, adhesive 12 should have a relatively small peel strength (e.g., on the order of one pound per inch width for electronic components or packages) or have a low softening temperature to allow for the removal of component 100 without the application of high, component-damaging heat. For such applications, adhesive 12 is a silicone, urethane or other low temperature plastic that exhibits a flowing viscosity prior to drying and that is flexible once dried. However, a more permanent bonding adhesive can be used in the present invention when component removal is of no concern. In all cases, the viscosity of adhesive 12 prior to drying should be low enough to fill interstices 20 between warp fiber tows 16 and fill fiber tows 18 of thermally conductive fabric 14, and to allow excess adhesive 12 to be pressed out or smoothed out as component 100 is seated on heat sink 200 with thermal bond system 10 interposed therebetween.

Figure 2:
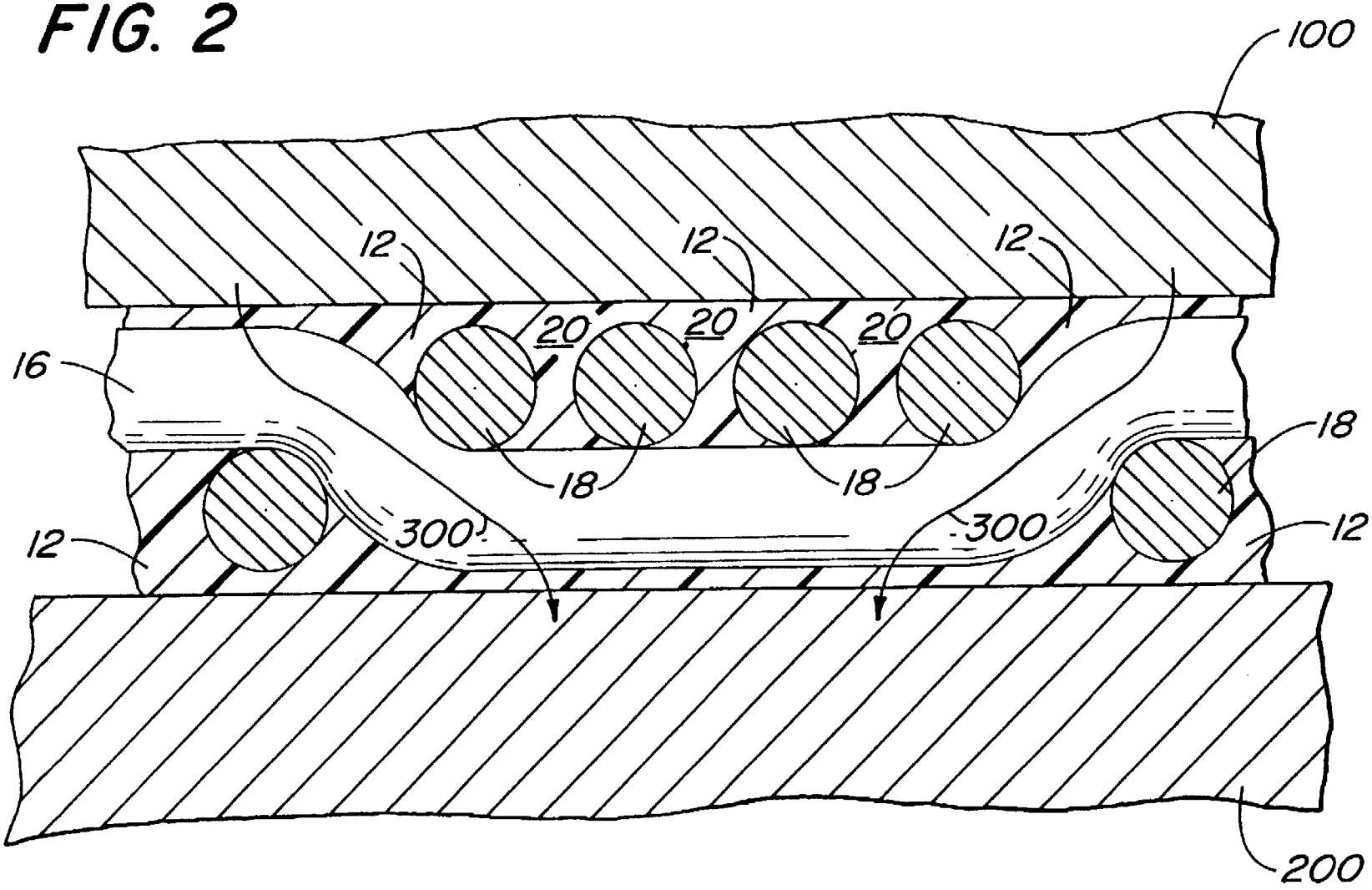
FIG. 2 is a cross-sectional view of the thermal bond system of the present invention using a satin weave fabric of thermally conductive fiber tows.

Referring now to FIG. 2, a cross-sectional view is shown of component 100 bonded to heat sink 200 using the thermal bonding system of the present invention. By way of additional illustrative example, thermally conductive fabric 14 is formed as a five-harness satin weave in which warp fiber tow 16 goes under every four fill fiber tows 18. Upon wetting fabric 14 with adhesive 12, interstices 20 are filled with adhesive 12. In addition, adhesive 12 will form at least a thin layer all along the opposing woven surfaces presented by fabric 14. The predominant flow of heat from component 100 to heat sink 200 follows the path identified by arrow 300. As is readily apparent, a similar heat flow path exists in fill fiber tows 18. Since adhesive 12 only exists as a thin-layer (e.g., on the order of a few tenths of a mil) where fiber tows 16 and 18 are closest to component 100 and heat sink 200, the low-conductive nature of adhesive 12 has a minimal effect on the system's overall thermal conductive properties. At the same time, interstices 20 form pockets where adhesive 12 contacts a relatively large surface area.

The advantages of the present invention are numerous. The use of a layer of woven, high thermal conductivity fibers provides for good heat transfer in all directions. The thermally conductive fibers in the fabric define a plurality of heat conductive paths from the heat-producing component to the heat sink so that heat can travel along the path of least resistance for efficient cooling.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A thermal bond system for bonding a first component that produces heat to a second component that dissipates heat, comprising:

a woven fabric composed solely of carbon; and an adhesive bond wetting said woven carbon fabric, wherein said woven carbon fiber fabric so wetted is interposed between said first component and said second component.

2. A thermal bond system as in claim 1 wherein said woven carbon fabric has its weave type selected from the group consisting of a plain weave, a basket weave, a twill weave, a crowfoot weave, a satin weave and a leno weave.

3. A thermal bond system as in claim 1 wherein said first component includes a bonding area, and wherein said woven carbon fabric is sized commensurate with said bonding area.

4. A thermal bond system as in claim 1 wherein said woven carbon fabric is made from tightly woven carbon fiber tows.

5. A thermal bond system as in claim 1 wherein said adhesive bond is selected from the group consisting of silicone and urethane.

6. A thermal bond system for bonding a first component that produces heat to a second component that dissipates heat, comprising:

tows woven together and composed solely of carbon fiber to define a fabric mesh having first and second opposing woven surfaces, wherein interstices are formed between adjacent ones of said carbon fiber tows; and an adhesive bond that is flowable prior to drying, said adhesive bond covering said first opposing surface and said second opposing surface, said adhesive bond further extending into said interstices.

7. A thermal bond system as in claim 6 wherein said fabric mesh has its weave type selected from the group consisting of a plain weave, a basket weave, a twill weave, a crowfoot weave, a satin weave and a leno weave.

8. A thermal bond system as in claim 6 wherein said first component includes a bonding area, and wherein said fabric mesh is sized commensurate with said bonding area.

9. A thermal bond system as in claim 6 wherein said carbon fiber tows are woven tightly to minimize the size of said interstices.

10. A thermal bond system as in claim 6 wherein said adhesive bond is selected from the group consisting of silicone and urethane.

11. A thermal bond system for bonding a first component that produces heat to a second component that dissipates heat, comprising:

a woven fabric that includes heat-conducting fibers running in both the warp and fill directions of said woven fabric, said fibers crossing each other so a to provide heat transfer in all directions, said woven fabric defining first and second opposing woven surfaces; and an adhesive bond that is flowable prior to drying, said adhesive bond covering said first opposing surface and said second opposing surface.

12. A thermal bond system as in claim 11 wherein said woven fabric has its weave type selected from the group consisting of a plain weave, a basket weave, a twill weave, a crowfoot weave, a satin weave and a leno weave.

13. A thermal bond system as in claim 11 wherein said first component includes a bonding area, and wherein said woven fabric is sized commensurate with said bonding area.

14. A thermal bond system as in claim 11 wherein said adhesive is selected from the group consisting of silicone and urethane.

15. A thermal bond system as in claim 11 wherein said heat-conducting fibers are made from materials selected from the group consisting of carbon, copper, gold, silver and aluminum.

16. A thermal bond system as in claim 11 wherein said heat-conducting fibers are carbon fiber tows.

* * * * *